United States Patent [19]

van Linden

[11] 4,437,650
[45] Mar. 20, 1984

[54] BRIQUETTE MELTING APPARATUS

[75] Inventor: Jan H. L. van Linden, Hampton Township, Allegheny County, Pa.

[73] Assignee: Aluminum Company of America, Pittsburgh, Pa.

[21] Appl. No.: 470,476

[22] Filed: Feb. 28, 1983

[51] Int. Cl.³ .............................................. F27B 3/18
[52] U.S. Cl. ................... 266/144; 266/235; 266/900; 266/901; 75/65 R; 75/68 R
[58] Field of Search .............. 266/235, 900, 901, 144; 75/65, 68

[56] References Cited

U.S. PATENT DOCUMENTS

| | | | |
|---|---|---|---|
| 4,060,408 | 11/1977 | Kuhn | 75/68 R |
| 4,147,531 | 4/1979 | Miller | 75/68 R |
| 4,286,985 | 9/1981 | VanLinden et al. | 75/65 R |

Primary Examiner—M. J. Andrews
Attorney, Agent, or Firm—Elroy Strickland

[57] ABSTRACT

Apparatus for melting relatively large floating units of metal scrap in a molten melting media or medium, the units having oxide films and solid, liquid and gaseous inclusions. After the units are charged into a melting medium, layers of freshly melted metal are presented to the molten media. The apparatus includes a bay for heating the molten media and means for pumping the media from the heating bay to a circular bay for receiving the large units of metal scrap. Located in the circular bay is a rotor means for moving the media therein at a velocity sufficient to sweep away the surface and insulating layers of the floating units in a rapid manner such that new metal is rapidly and continuously exposed to the melting media without the floating units being submerged in the media. A third bay is included for collecting skim material from the molten media leaving the circular bay. Inlet and outlet troughs extend tangentially to and from the circular bay for directing molten media respectively to the charging bay from the pumping means and from the charging bay to the skim collecting bay. A combustion chamber is located adjacent the charging bay for burning organic material vaporized in the charging bay.

7 Claims, 4 Drawing Figures

BRIQUETTE MELTING APPARATUS

BACKGROUND OF THE INVENTION

The present invention relates generally to the melting of metal scrap and particularly to the melting of large bales or briquettes of metal scrap in a manner that limits the formation of skim material.

Large bales and briquettes of metal scrap generally behave as solid units when disposed in a molten melting medium, and because the units are usually less dense than the melting medium, the units float in the medium. Such units are comprised of multilayered composites of good conductive, solid particles of fast melting metal, and good insulators, such as metal oxides, paint and/or oil films and air and other gaseous inclusions that generally surround and insulate each particle of metal. Because of the insulating nature of such films and inclusions, the units are slow to melt and fuel is wasted in the melting process. The need therefore in melting large units of scrap material is the removal of the insulating materials in as rapid a manner as possible, the metal then being exposed to and available for rapid melting by the melting medium. Simultaneously, it is desirable to keep the units afloat in the medium so that any paint or organic materials on and in the units are vaporized and given opportunity to undergo combustion. If lacquer, for example, is submerged in molten aluminum, the lacquer tends to oxidize the aluminum, or at least contributes to the oxidation of the bath, which then accumulates in the aluminum and system as skim. The burning of such lacquers and other combustibles therefore greatly reduces the amount of skim produced in a melting system.

U.S. Pat. No. 4,060,408 to Kuhn, issued Nov. 29, 1977, shows a system for melting large units of floating scrap using a "split hearth" arrangement, i.e. an arrangement in which a charging bay and a heating bay occupy an integral structure, the two bays being separated by a partition. Though this system can ablatively remove insulating material in the large units, the process is slow such that a large structure is required to obtain a degree of efficiency and melt rate. Because, however, the structure is large, the velocity of the melting medium dissipates rapidly, resulting in the end, in a reduced ablative capability.

In U.S. Pat. No. 4,286,985 issued to VanLinden et al on Sept. 1, 1981, a melting system is disclosed in which floating scrap material is ingested into a vortex of melting media in a manner that is much more efficient than prior known devices. As will be seen below, such a system, however, is not suitable for melting large briquettes of solid scrap though it can be used in combination with the apparatus of the invention.

BRIEF SUMMARY OF THE INVENTION

The present invention is directed to the use of a circular charging bay, the circular or round shape of the bay providing the best opportunity for moving a melting medium at a velocity sufficient to remove and sweep away the insulating components in large units of metal scrap. The velocity of movement and sweeping action of the medium is effected by the rotation of a rotor, located in the bay, at an appropriate RPM and velocity, beneath the level of the melting medium and the units of scrap, the units floating in the melting medium. The rotor moves the medium at the sweeping velocity without submerging the units, thereby allowing the vaporization of any organic material associated with the units in the bay and the burning of the vapors in a combustion chamber located to receive the vapors. The round bay can be used in conjunction with any circulating melt system, the bay having, in addition, tangential inlet and outlet troughs to facilitate flow of the medium into and from the bay. Further, a shroud is provided to protect the shaft of the rotor from the large floating units, and a "flag" is employed to keep the units from traveling with the movement of the medium, thereby maximizing the effect of the sweeping action of the medium.

THE DRAWINGS

The invention, along with its objectives and advantages, will best be understood from consideration of the following detailed description in conjunction with the accompanying drawings in which.

PREFERRED EMBODIMENT OF THE INVENTION

Figure 1:
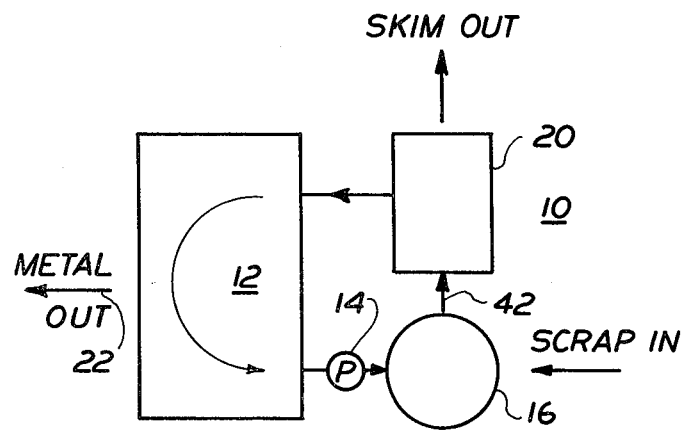
FIG. 1 is a schematic plan view of a continuous melting system using the circular charging bay of the invention.

Referring now to FIG. 1 of the drawings, a continuous circulatory melting system 10 is shown schematically, the system including a bay 12 for heating a molten medium 11 (FIG. 3), such as molten aluminum, to a superheated temperature. The heated medium is directed from bay 12 by pump means 14 to a circular bay 16 into which large bales or briquettes 18 (FIG. 3) of metal scrap are directed or "charged". From bay 16, the molten medium is directed to a bay 20, in which skim material is collected and removed from the medium and thus from the system. Molten metal product is removed from heating bay 12, as indicated by arrow 22, at a rate commensurate with the feed rate of scrap metal (18) to bay 16.

In heating bay 12 the melting medium is heated by appropriate burners or other heating means (not shown) to a temperature significantly above the melting temperature of the metal of bales 18 to provide the heat necessary to melt the bales. This is generally known as superheating, i.e. heating substantially above the melting temperature of the metal of 18 so that heat can be removed from system 10 in the process of melting the metal without solidification of the melting medium. When the melting medium is molten aluminum, a suitable temperature range of the aluminum is about 1400°–1500° F. A suitable temperature for the aluminum leaving charging bay 16 is on the order of 1300° F., depending upon the rate at which charge material (bales 18) is fed to the bay and system and the rate at which the molten medium is circulated in the system.

Figure 2:
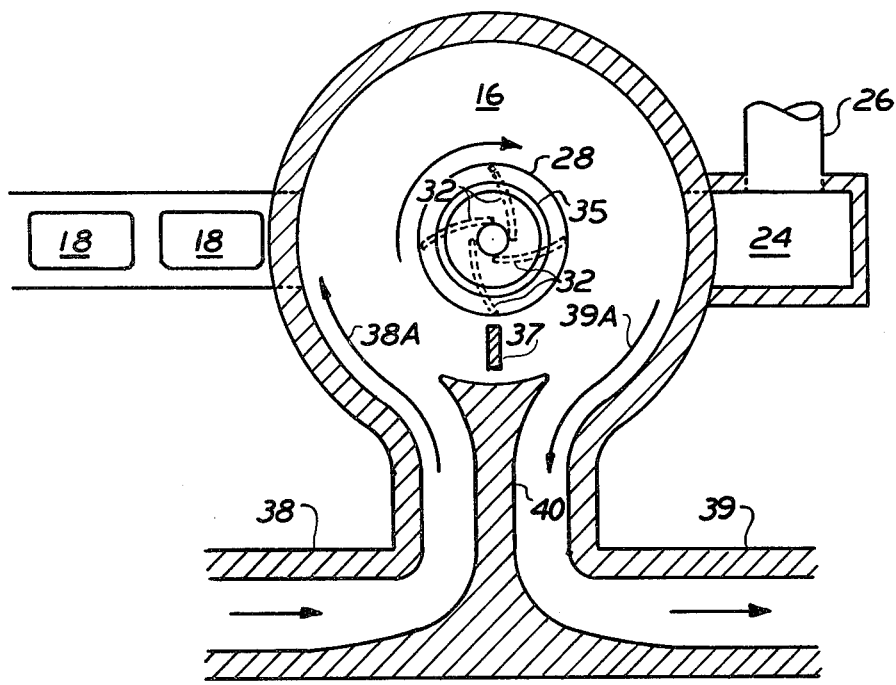
FIG. 2 is a diagrammatic horizontal section of the circular charging bay, with tangential inlet and outlet troughs and an associated combustion chamber.

FIG. 2 of the drawings shows in horizontal section the circular charging bay 16 of FIG. 1. Such a bay configuration provides the opportunity to move the melting medium at a velocity sufficient to remove and sweep away the surface layers of bales 18 at a rapid rate without restricting the size of heating bay 12 and without submerging the bales in the medium. In this manner any organic material associated with the bales is vaporized by the heat of the bay and burnt in a combustion chamber 24 located immediately adjacent the bay. An exhaust stack 26 receives the products of such combustion, and is preferably connected to heating bay 12 to direct such products to the heating bay. In this manner, the heating function of the heaters (not shown) in the bay is thereby augmented in a convenient and economical manner in the process of maintaining the molten temperature of the melting medium.

Figure 3:
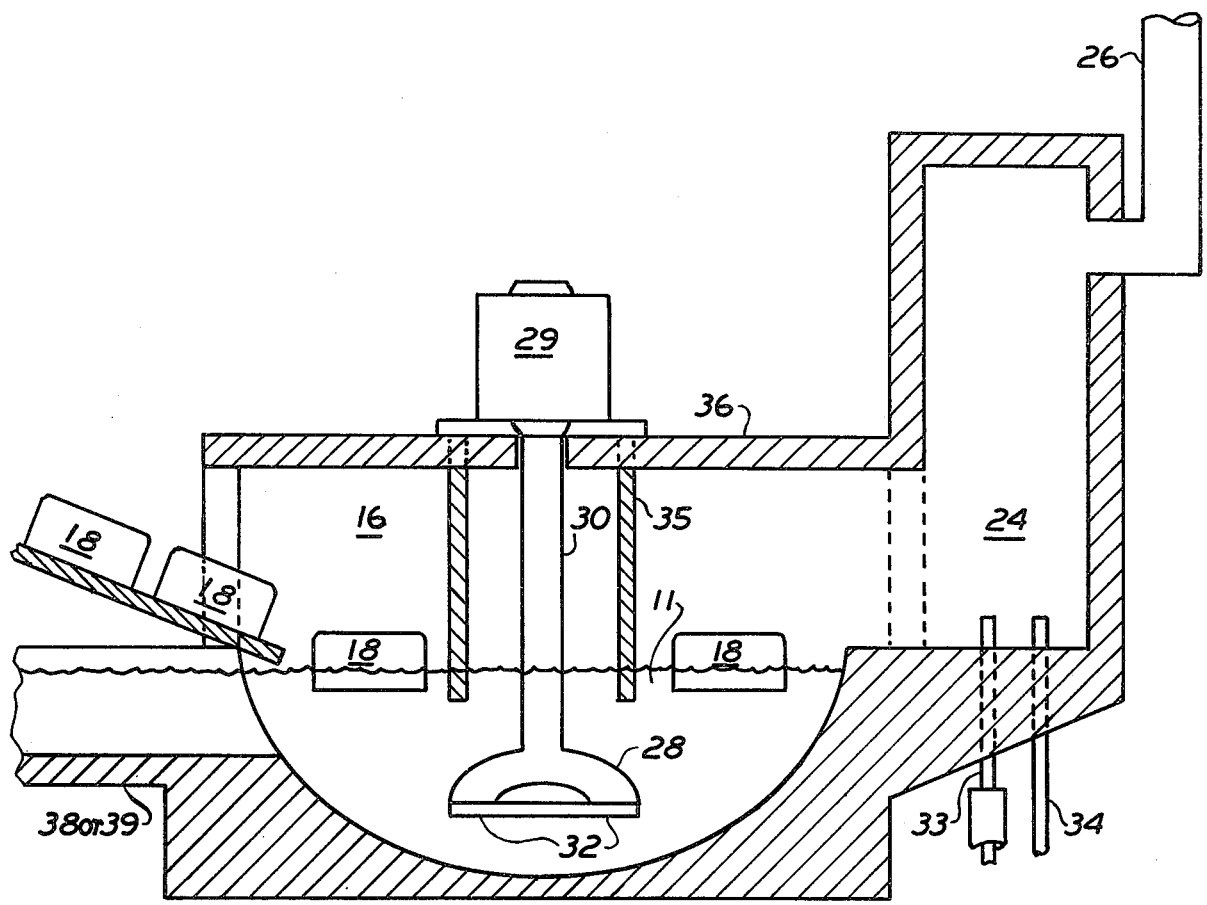
FIG. 3 is a diagrammatic vertical section view of the circular charging bay of FIG. 2, with certain items associated therewith being shown in elevation.

The sweeping action of the melting medium in circular bay 16 is effected by the rotation of a rotor 28, driven by an appropriate motor 29 and shaft 30. As seen in FIG. 3 of the drawings, the rotor is located in a position below the upper level of the melting medium 11 and below the level of the floating units 18. Since the medium is several hundreds of degrees F. above the melting temperature, and the environment above the medium is at an even higher temperature, the material of the rotor and of the shaft must be resistant to such a temperature and environment. The shape of the rotor is smooth on the upper portion thereof to minimize impact and collision with floating units of scrap. For similar reasons, any vanes (32) provided on the rotor for stirring the melting medium are located on the bottom of the rotor to avoid contact with the briquettes.

Rotor 28 moves the medium in bay 16 of a velocity sufficient to effect washing and sweeping without submerging units 18, i.e. the rotor provides a relatively shallow vortex (not shown) in the molten medium 11 (in bay 16) that does not draw the units beneath the level of the medium. This is accomplished with a set of curved vanes 32 located on the bottom face of the rotor, as shown in FIG. 2. The vanes, when moved through the melting medium at an appropriate velocity, move the medium at a velocity sufficient to sweep away the insulating layers in units 18 and thereby bare the metal particles in the units to effect rapid melting of the particles by the melting medium. Since the units are not submerged by such action, any grease, oil, paint, lacquer or other volatile substances on and in the units are vaporized by the heat of the molten medium and then drawn into combustion chamber 24 by reduced pressure in flue 26. In chamber 24 the vapors undergo combustion, which is effected by appropriate combustion means, such as gas burners 33 and a supply of air entering through tube 34.

A protective shroud or shield 35 is located around shaft 30 to prevent the floating units 18 from contacting and damaging the shaft. The shroud is shown in FIG. 3 extending from an upper wall 36 of the charging bay and into the molten medium 11. The shroud is made of a suitable high strength, heat-resistant material.

A barrier structure or flag 37 (FIG. 2) is located in the path of the moving medium to prevent the floating units from simply traveling with the movement of the medium. In this manner, the medium is able to move past the units to sweep away the insulating materials from the metal particles.

To facilitate the flow of the melting medium into and out of the circular bay of 16, the bay is provided with inlet and outlet troughs 38 and 39 that join the bay in a tangential manner, as best seen in the view of the bay depicted in FIG. 2. The two troughs are divided by a center wall structure 40 in the area in which the troughs join the structure of the bay, such that ingress and outgress of the melting medium, as indicated by arrows 38A and 39A in FIG. 2, do not interfere with one another in any substantial manner.

The melting medium leaves circular bay 16 through trough 39 and is directed to bay 20, as indicated in FIG. 1 by arrow 42, where any skim material in the medium leaving bay 16 is collected and removed from the system in a well-known manner. In the present invention, however, skim material is kept to a minimum by virtue of the fact that the units 18 are not submerged in the medium, thereby allowing any combustible material associated with the units to be vaporized and burned. As noted earlier, lacquer submerged in molten metal causes oxidation of the metal, which would be collected as skim in bay 20.

Figure 4:
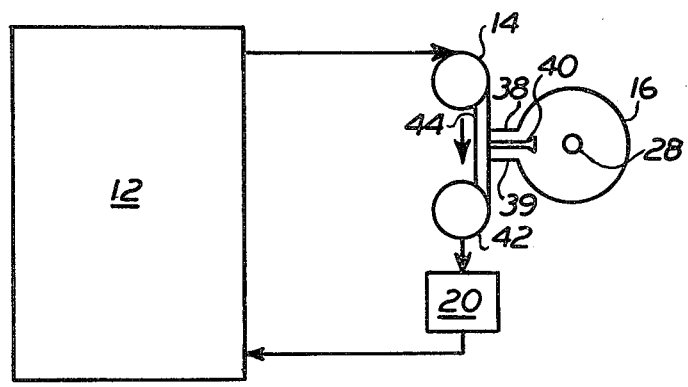
FIG. 4 is a diagrammatic plan view of the melting system of the invention in combination with the vortex melting arrangement of the above U.S. patent to VanLinden et al.

In the apparatus and process described thus far, the circular charging bay 16 has been connected in a serial manner with the heating, pumping and skim collecting bays 12, 14 and 20. However, as shown in FIG. 4, the charging bay can be connected in parallel with the main circuit of the system, and a receptacle 42 for rapidly ingesting solid scrap in accordance with the above U.S. patent to VanLinden et al can be included serially in the main circuit. As depicted in FIG. 4, receptacle 42 is connected directly and serially to the output of pump 14 via a conduit 44, while charging bay 16 is connected to the conduit in a manner that allows the bay to be installed and operated as a separate module. By the use of appropriate baffles or other suitable means (not shown), the entrance and exit troughs 38 and 39 of the charging bay can be closed to allow the bay to be shut down or to run in an idle manner, or opened to direct the melting medium and scrap therethrough. If the system, for example, is handling only small pieces of solid scrap, use of the circular charging bay is not necessary.

While the invention has been described in terms of preferred embodiments, the claims appended hereto are intended to encompass all embodiments which fall within the spirit of the invention.

What is claimed is:

1. Apparatus for melting relatively large floating units of metal scrap in a molten melting media, the units having oxide films and solid and gaseous inclusions on and near the surfaces of the units as well as layers of freshly melted metal after the units enter the melting media, the apparatus comprising:

a bay for heating the molten media, a bay for pumping the media from the heating bay to a circular charging bay, a circular charging bay for receiving large floating units of metal scrap, and a rotor means located in said bay for moving the media therein at a velocity sufficient to remove the surface layers of the floating units such that new metal is continuously exposed to the melting media without the floating units being submerged in the media, means for preventing the floating units from moving with the media in the charging bay, a bay for collecting skim material, inlet and outlet troughs extending tangentially to and from the circular charging bay for directing molten media respectively to the charging bay from the pumping bay, and from the charging bay to the skim collecting bay, means for directing molten media from the skim collecting bay to the heating bay, and a combustion chamber located adjacent the charging bay for burning organic material washed from the floating units by the molten media.

2. The apparatus of claim 1 in which the rotor is supported on a shaft extending into the charging bay, and a shroud structure is located about the shaft to protect the same against floating units of scrap within the bay.

3. The apparatus of claim 1 in which the means for preventing the floating units from moving with the media is a fixed flag structure located in the melting medium in the charging bay.

4. The apparatus of claim 2 in which a partition divides the inlet and outlet troughs, and extends toward the shroud structure.

5. The apparatus of claim 1 in which the heating, pumping and skim collecting bays are connected together in a main fluid circuit, with the charging bay being located in a manner that allows the bay to be connected in and removed from the main circuit.

6. The apparatus of claim 5 in which a receptacle for rapidly ingesting solid metal in the melting medium is serially connected in the main circuit of the heating, pumping and skim collecting bays.

7. The apparatus of claim 1 in which the rotor has a lower surface located in the melting medium, and faces the bottom of the charging bay, said lower surface having vane structures that move the melting medium in the charging bay when the rotor is rotated.

* * * * *